United States Patent
Fong et al.

(10) Patent No.: US 7,949,734 B1
(45) Date of Patent: May 24, 2011

(54) METHOD AND APPARATUS FOR RE-GENERATING CONFIGURATION COMMANDS OF A NETWORK DEVICE USING AN OBJECT-BASED APPROACH

(75) Inventors: Albert Meng Fong, Fremont, CA (US); Xiaobing Xie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1374 days.

(21) Appl. No.: 10/842,016

(22) Filed: May 6, 2004

(51) Int. Cl.
*G06F 15/16* (2006.01)
(52) U.S. Cl. ......... 709/221; 709/223; 709/224; 709/226
(58) Field of Classification Search ........... 709/223–226
See application file for complete search history.

(56) References Cited

U.S. PATENT DOCUMENTS

| 7,065,562 B2 * | 6/2006 | Courtney | 709/220 |
| 2003/0074430 A1 * | 4/2003 | Gieseke et al. | 709/221 |
| 2004/0078787 A1 * | 4/2004 | Borek et al. | 717/136 |
| 2004/0160464 A1 * | 8/2004 | Reyna | 345/854 |
| 2006/0235968 A1 * | 10/2006 | Murray et al. | 709/224 |
| 2007/0011348 A1 * | 1/2007 | Bansal et al. | 709/238 |

OTHER PUBLICATIONS

Configuration Generation Performance Enhancement, Cisco IDS Release 12.3(7)T and 12.2(25)S, Cisco Systems, Inc. 2004 (pp. 1 through 8).

* cited by examiner

*Primary Examiner* — Jeffrey Pwu
*Assistant Examiner* — Sulaiman Nooristany
(74) *Attorney, Agent, or Firm* — Hickman Palermo Truong & Becker LLP

(57) ABSTRACT

A method is disclosed for re-generating a configuration command of a network device. A method includes receiving a request to re-generate a configuration command previously issued to a network device, wherein the configuration command has one or more parameters; retrieving a template and a pattern associated with the configuration command, wherein the template represents a syntax for the configuration command, wherein the pattern represents a storage location for the configuration command; based on the pattern, retrieving from an object database all objects containing values for all the particular parameters from the storage location specified by the pattern; and creating a re-generated configuration command by substituting the values of the retrieved objects into the template.

33 Claims, 4 Drawing Sheets

US 7,949,734 B1

METHOD AND APPARATUS FOR RE-GENERATING CONFIGURATION COMMANDS OF A NETWORK DEVICE USING AN OBJECT-BASED APPROACH

FIELD OF THE INVENTION

The present invention generally relates to management of network devices. The invention relates more specifically to re-generating configuration commands of a network device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A general-purpose network device, such as a router or a switch for a packet-switched network, may be configured to provide specific services and functions by loading a configuration in the device. Typically devices provide a command-line interface, so that loading a configuration may be performed by entering one or more configuration commands at a console that is coupled to the device, or by loading a previously prepared file that contains a batch of configuration commands. Once entered in the device, the commands are internally parsed by the device, converted into an internal representation in memory or data structures, and executed if necessary. However, to reduce the amount of required storage, the literal text of the configuration command is not stored internally.

The complete configuration of a network device can be lengthy and complex, involving hundreds or thousands of lines of configuration commands. Therefore, network administrators and other users of network devices need a mechanism to cause the network devices to display or output one or more parts of the current configuration.

For example, a network administrator may wish to display the then-current configuration of a particular router interface. In one approach, which is implemented by routers and other devices from Cisco Systems, Inc. that use the Cisco Internetworking Operating System or IOS® software, a "show" command is provided. Entering the "show" command, with one or more arguments or parameters representing an aspect of configuration, causes the IOS® device to re-generate the configuration command that was previously used to establish that aspect of the configuration.

Because the output of the "show" command is configuration command information that is normally displayed or saved in a non-volatile (NV) storage medium, the element of IOS® software that performs command re-generation has been termed an "nvgen" process. Numerous past versions of IOS® software have implemented an "nvgen" process.

However, past approaches for command re-generation have focused on the syntactic structure of the commands that need re-generation. Commands have been re-generated by following a syntax definition for the requested command and retrieving values for each parameter or argument serially as the parameters or arguments are encountered in the syntax definition. If a parameter or argument is used multiple times in different re-generated commands, then multiple retrieval operations have been necessary. Further, there has been no way for external processes to obtain the values of parameters or arguments independent of the re-generation process.

Based on the foregoing, there is a clear need for an improved approach for re-generating commands in network devices.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
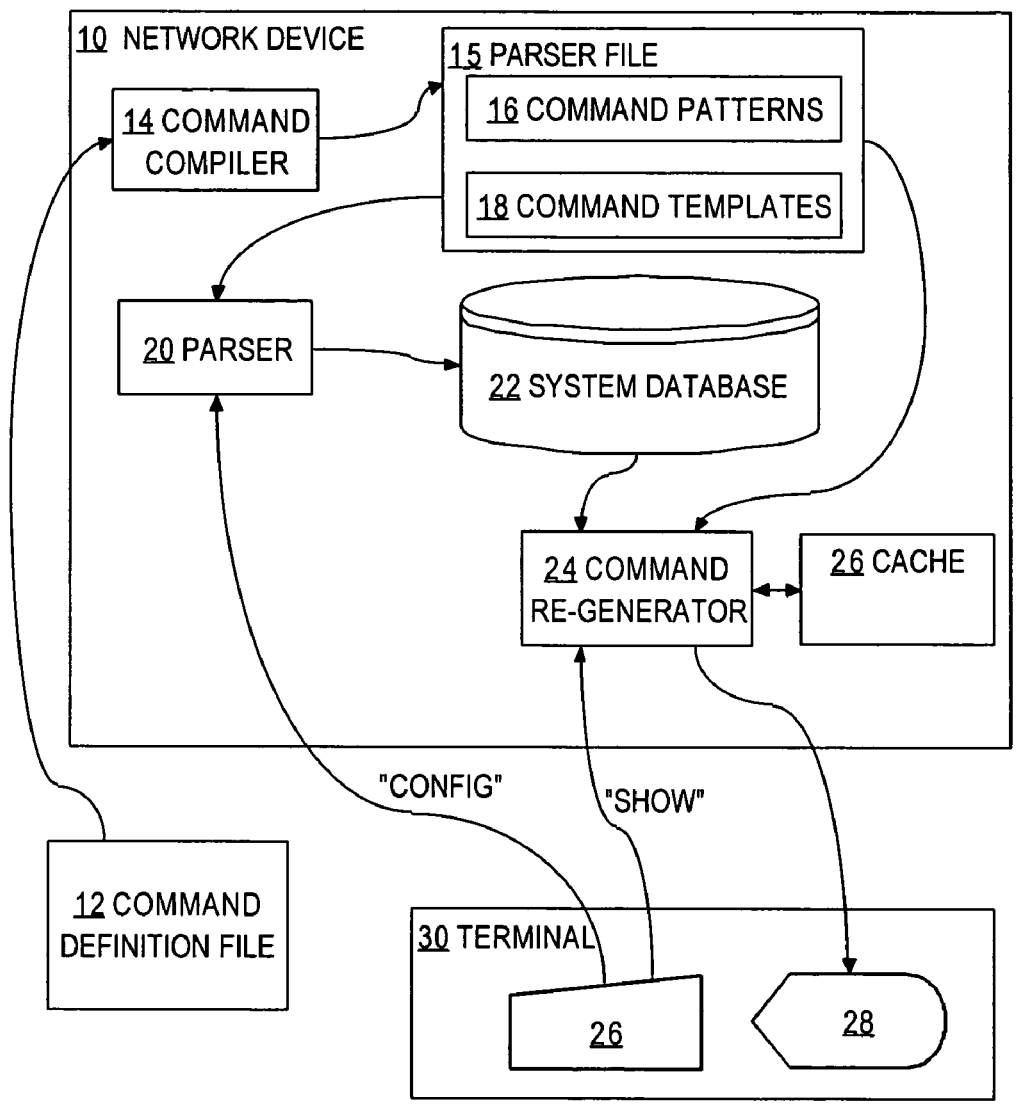
FIG. 1 is a block diagram of a system that may be used for command re-generation using a command argument object-based approach.

A method and apparatus for re-generating configuration commands of a network device using an object-based approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Example Command Re-generation System
   2.2 Functional Description
   2.3 Multi-Option Command Example
   2.4 Mapping Command Templates to Leaf Nodes in Database
3.0 Implementation Mechanisms—Hardware Overview
4.0 Extensions and Alternatives

---

1.0 General Overview

The needs identified in the foregoing Background, and other needs and objects that will become apparent for the following description, are achieved in the present invention, which comprises, in one aspect, a method, comprising the computer-implemented steps of: receiving a request to re-generate a configuration command previously issued to a network device, wherein the configuration command has one or more parameters; retrieving a template and a pattern associated with the configuration command, wherein the template represents a syntax for the configuration command, wherein the pattern represents a storage location for the configuration command; based on the pattern, retrieving from an object database all objects containing values for all the particular parameters from the storage location specified by the pattern; and creating a re-generated configuration command by substituting the values of the retrieved objects into the template.

According to one feature, the method comprises receiving a command definition file that defines the syntax of the configuration command; and compiling the command definition file to result in creating and storing one or more command-path patterns and command templates corresponding to the configuration command. In another feature, the method involves receiving a configuration command; creating one or more objects in the object database for one or more argument values of the configuration command; storing the objects in the object database based on the template.

In another feature, the method involves providing the re-generated configuration as output in response to a "show" command. In a related feature, the re-generated configuration is provided as output to a requesting process.

In yet another feature, retrieving all objects further comprises creating the one or more objects in a cache in main memory. In another alternative, the method further involves retrieving all objects containing values for all parameters of one or more commands; and storing all the objects in a cache in main memory.

In yet another aspect, the invention includes a method of re-generating configuration commands of a network device using an object-based approach, comprising the computer-implemented steps of creating and storing one or more command-path patterns and one or more command templates representing one or more configuration commands for a network device, wherein one or more of the configuration commands define one or more parameters; receiving a particular configuration command and one or more particular parameters; creating one or more objects respectively representing the one or more particular parameters based on parsing the particular configuration command; receiving a request to re-generate the particular configuration command; retrieving a template and a pattern associated with the particular configuration command; based on the pattern, retrieving all objects containing values for all the particular parameters; and creating a re-generated configuration command by substituting the values of the retrieved objects into the template.

In other aspects, the invention encompasses a computer apparatus and a computer-readable medium configured to carry out the foregoing steps.

2.0 Structural and Functional Overview 2.1 Example Command Re-Generation System

FIG. 1 is a block diagram of a system that may be used for command re-generation using a command argument object-based approach. A network device 10 is communicatively coupled to a network that may include one or more other network devices. The network device 10 comprises a command compiler 14, parser 20, system database 22, command re-generator 24, and command cache 26. The network device 10 receives, or can access, a command definition file 12. The command compiler 14, parser 20, and command re-generator 24 each may be implemented as one or more computer programs, processes, or other software elements. In one embodiment, command compiler 14, parser 20, system database 22, and command re-generator 24 are elements or modules of an operating system that controls or supervises operation of network device 10, such as a switch or router in a packet-switched network. Further, system database 22 may be a database that is maintained by the operating system for general supervisory purposes.

In one embodiment, a terminal 30 comprising a data input device 26 and a data output device 28 is communicatively coupled to network device 10 for the purpose of providing configuration commands to the network device and requesting re-generation of commands. In other embodiments, the functions described herein for terminal 30 may be performed automatically by a machine, process, computer program, or other software element. Cache 26 is arranged in main memory of network device 10, and provides transient local storage for command information that command re-generator 24 retrieves from system database 22. The cache 26 is accessible locally to command re-generator 24 and is also accessible to external processes not shown in FIG. 1.

Command compiler 14 receives a command definition file 12 that defines the syntax or grammar for one or more configuration commands or executive mode commands, according to a command definition language. The command definition file 12 also declares one or more command-path patterns and command templates using respective special language primitives of the command definition language. Command compiler 14 is configured to receive the command definition file 12 as input, compile the command definition file, and create one or more command-path patterns 16 and command templates 18 as output. The command-path patterns 16 and command templates 18 may be stored in a binary representation within a parser file 15.

In one embodiment, the command-path patterns specify a location in an object database at which objects associated with a command are stored. For example, command-path patterns may be expressed in a pathname format that correspond to locations where object values are located in the system database 22. Command-path patterns also maps command templates to commands. The object database is structured as a multi-way object tree, and a command-path pattern specifies a path to a node in the object tree; in one embodiment, a command-path pattern may include wildcard characters so that the pattern acts as a filter or specifies a set of nodes in the object database tree. Command templates specify the text output format to be used for a re-generated command. To re-generate a previously entered configuration command, command re-generator 24 receives the command-path patterns 16 and command templates 18 and re-generates a configuration command as described further herein.

Parser 20 is configured to receive parser file 15 upon boot-up of network device 10 and construct a parse table in main memory for use in subsequent parsing operations. As a result, parser 20 acquires knowledge of the grammar of the commands defined in the system. Parser 20 is also configured to receive configuration commands entered at terminal 30, to parse the commands based on the parse table, to associate the parsed commands with one of the command-path patterns 16, and to save values of arguments, parameters, or other data objects of the configuration commands in system database 22. The objects are saved in system database 22 at a logical location indicated by the command-path patterns.

Command re-generator 24 is configured to receive, from terminal 30, a request to re-generate a previously entered configuration command, using the techniques described herein. Command re-generator 24 receives command-path patterns 16 from parse file 15, object values from system database 22 at locations indicated by the command-path patterns, and command templates 18 from the parse file as input. Command re-generator provides re-generated command data, such as text or string data values, as output to terminal 30 or to a requesting process.

System database 22 provides centralized storage of object values and other information used in operation of network device 10. System database 22 may be configured in main memory or in non-volatile storage such as disk. In one embodiment, network device 10 is arranged as a complex, multi-processor, distributed packet routing system, as in the case of the Cisco CRS Series Carrier Routing System from Cisco Systems, Inc. Such a system comprises a plurality of line cards and route processors. The system database 22 is shared by a plurality of system components such as the line cards and route processors. Thus system database 22 presents a global view of data relating to all elements of the distributed system.

In one embodiment, network device 10 has a distributed architecture, and command re-generator 24 is implemented as a process that may be spawned by any of a plurality of elements in the network device. Thus, a command re-generator process may execute in any line card, route processor or other node of the network device 10, but all such processes interact with one system database 22. Each command re-generator process receives a copy of the parser file 15 for local use at the node on which it is executing.

A practical embodiment of network device 10 may include other elements. For example, network device 10 may include an executive program that receives user input consisting of one or more executive mode commands, calls the parser to parse the input, and then initiates a process to execute the user command. Thus, executive mode commands are executed relatively immediately to directly affect operation of the network device 10, rather than acting to re-configure an aspect of the network device, as with configuration commands. Network device 10 may include a configuration process that invokes the parser in the manner indicated herein and calls the system database 22 to change the configuration of the network device.

2.2 Functional Description

An overview of a process for re-generating network device configuration commands using an object-based approach is now described with reference to FIG. 2A, FIG. 2B, FIG. 3, FIG. 4. For purposes of illustrating the operation of an embodiment with clarity, a specific example of defining, processing, and re-generating a network device configuration command is also now described. However, embodiments may be used with any form of command, and the invention is not limited to the particular example command described below.

Figure 2A:
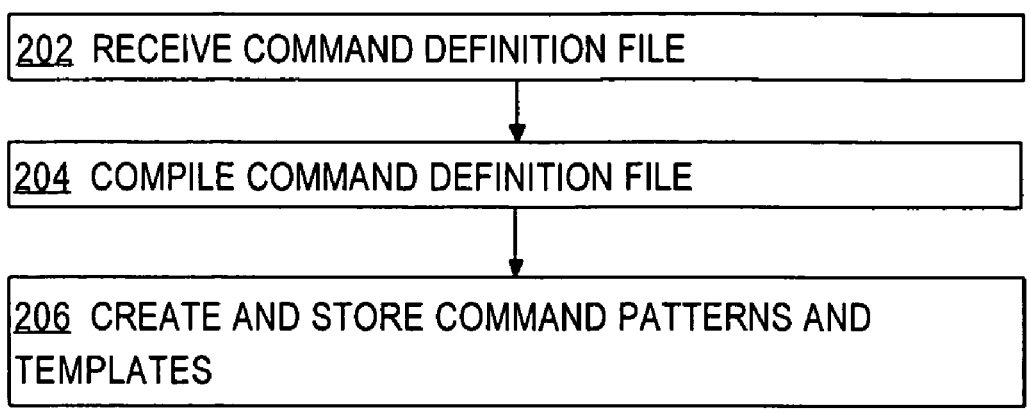
FIG. 2A is a flow diagram showing a high-level overview of a process of creating command-path patterns and templates.
Figure 2B:
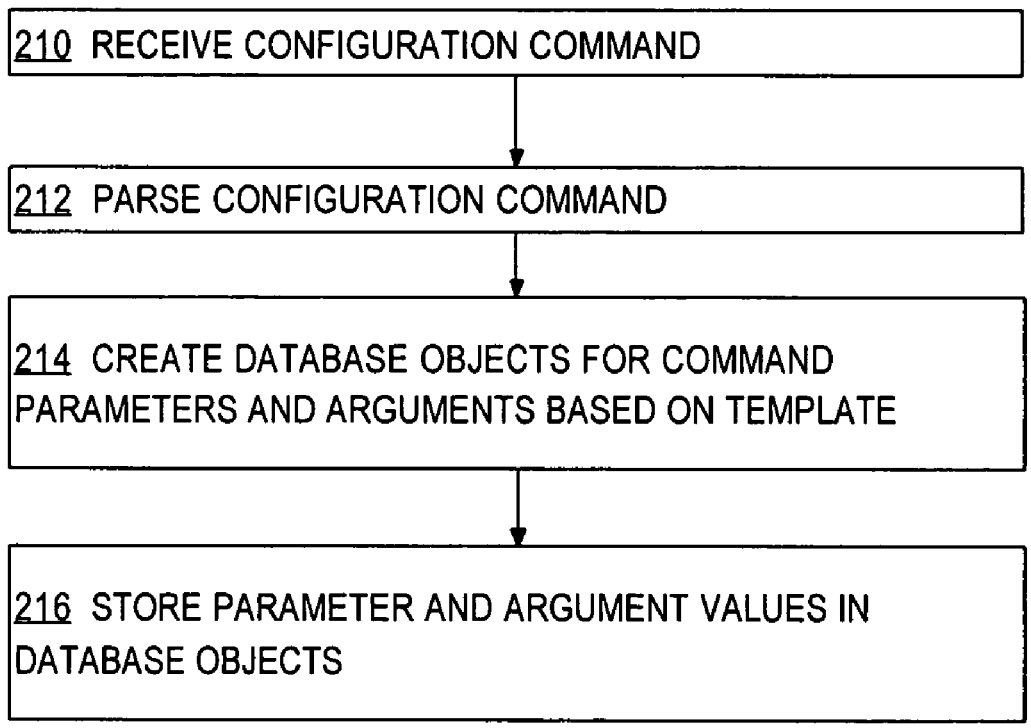
FIG. 2B is a flow diagram showing a high-level overview of a process of storing network device commands using a command argument object-based approach.
Figure 3:
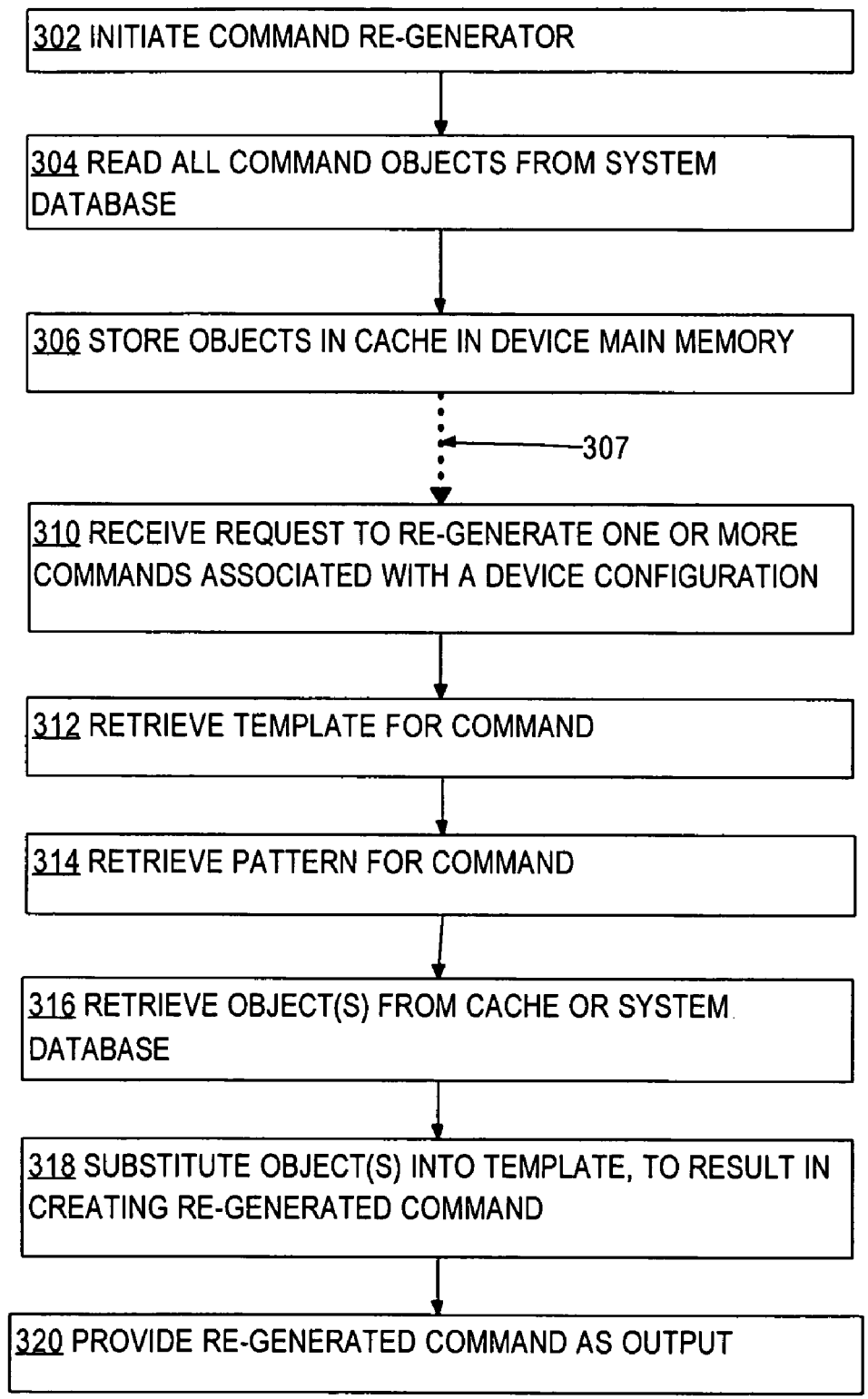
FIG. 3 is a flow diagram showing a high-level overview of an example process of re-generating network device commands using a command argument object-based approach.

FIG. 2A is a flow diagram showing a high-level overview of a process of creating command-path patterns and templates. FIG. 2B is a flow diagram showing a high-level overview of a process of storing network device commands using a command argument object-based approach. FIG. 3 is a flow diagram showing a high-level overview of an example process of re-generating network device commands using a command argument object-based approach.

As a specific illustrative example, assume that the techniques herein are used to define, process and re-generate a command with the following intended syntax:

username "name-string" level "access-level-number"

Thus, the example command is used to configure a router or other network device with a username having whatever value is specified by the "name-string" parameter, and associated with an access privilege level value as specified by the "access-level-number" parameter. In actual use, an administrator or other individual issues the example command with specific values for "name-string" and "access-level-number." For example, the administrator could issue a command as:

username cpalermo level 99

A command having the foregoing syntax can be represented in the following abstract form:

username <object-1> level <object-2> where <object-1> and <object-2> are argument variables that users enter during device configuration. The representation <object-1> corresponds to "cpalermo" and <object-2> corresponds to "99" in the above example.

Referring first to FIG. 2A, in step 202, a command definition file is received. For example, in a preparatory step, an individual who is developing configuration commands defines the syntax of a command by creating a command definition file 12 (FIG. 1). A command definition file declares, according to a specified command definition language, proper syntax and allowed parameters or arguments for one or more commands. In one embodiment, the command definition file is a text file having a file extension of ".cmd" and declares the following elements for one or more commands:

1. keyword: The actual word as part of the command.
2. object: The object argument number that the command will use.
3. tuple: The location in the system database, such as system database 22 of FIG. 1, at which particular command argument values are stored.

Assume that the following values are defined in command definition file 12 for the example command:

| | |
|---|---|
| keyword: | username |
| | object <1> |
| keyword: | level |
| | object <2> |
| tuple: | /cfg/gl/username/<1>/level=<2> |

In step 204, the command definition file is compiled. As steps in compilation, one or more command-path patterns and command templates are stored, as indicated in step 206. In one embodiment, each stored command-path pattern corresponds to a tuple defined in the command definition file 12. Each stored command template is created in the parsing process based on the values defined in the command definition file. Thus, continuing with the example above, in step 206 "/cfg/gl/username/<1>/level=<2>" is stored as a command-path pattern. The tuple and pattern specify a path through a multiway tree; system database 22 is organized as a multiway tree of objects. Thus, the example tuple and pattern indicate that values of parameters for "username" configuration commands are stored and can be found in system database 22 at the tree path determined by starting at the root "cfg" (config) object and walking to the /gl/username node.

For the example described above, the following template is created and stored as part of steps 204, 206:

"username <1> level <2>"

The steps of FIG. 2B may be performed, for a particular configuration command, at some point in time after the preparatory steps of FIG. 2A are performed. For example, FIG. 2A represents compile time, and FIG. 2B represents run time. Referring now to FIG. 2B, in step 210, a configuration command is received. As examples, step 210 involves network device 10 receiving a configuration command from terminal 30 through a console interface, or the network device receives a configuration command automatically through a management application or other process.

In step 212, the configuration command is parsed, and in step 214, one or more database objects are created for parameters and arguments of the configuration command, based on an associated template. Parameter and argument values in the configuration command are then stored in the database objects, as shown in step 216.

Assume, for example purposes, that a user of terminal 30 enters the configuration command: "username foo level 11". Thus, parameter values or argument values of the configuration command are "foo" and "11." The values are saved into the system database 22 according to the tuple declaration, stored as a pattern, as:

/cfg/gl/username/foo/level=11

As a result, parameter and argument values are created and stored in an object database and become available for use in later command re-generation.

The process shown in FIG. 3 is now described. Steps 302-306 may be performed optionally, at an earlier time than steps 310-320, as indicated by arrow 307. In step 302, a command re-generator is initiated. For example, when device 10 starts operation or boots up, command re-generator 24 initializes and becomes ready. In step 304, all command objects are read from the system database. For example, command re-generator 24 retrieves all command object values for parameters and arguments of all previously entered configuration commands from system database 22. The retrieved object values may be stored in a cache in device main memory, such as cache 26, as shown in step 306. Thus, using the optional process of steps 302-306, a network device builds a cache of object values corresponding to all previously entered configuration command parameters and arguments. As a result, subsequent command re-generation operations proceed rapidly and efficiently, without repeated accesses to system database 22.

At some point thereafter, in step 310, a request to re-generate one or more commands associated with a device configuration is received. Step 310 involves, for example, a network device receiving a request to re-generate a configuration command. In one embodiment, the request to re-generate is a "show" command that specifies another configuration command. Assume, for purposes of an example, that a user of terminal 30 enters the command "show username".

In response, in step 312, a template associated with the command is retrieved. In step 314, a pattern for the command is retrieved.

Values for one or more objects associated with the command are retrieved at step 316. If steps 302, 304, 306 were performed previously, then step 316 may involve retrieving object values from the cache. If the needed object values are not in the cache, or if steps 302, 304, 306 were not performed, then step 316 involves retrieving the object values from the system database. In one embodiment, when object values are retrieved from the system database at step 316, the retrieved object values are immediately cached. In this approach, subsequent requests to re-generate other commands, or to process sub-modes of a command, need not retrieve duplicate object values from the system database again. As a result, command re-generation is performed efficiently and with minimum impact on the system database.

The retrieved values are substituted into the template, to result in re-generating the command, as shown in step 318. The re-generated command is provided as output at step 320.

As an example of the processing of step 312 to step 320, command re-generator 24 searches system database 22 for to determine whether the database contains object values at locations specified in the "username" pattern "/cfg/gl/username/foo/level". If one or more matching object values are found, then the associated template is retrieved. Based on the template, command re-generator 24 retrieves all values for all objects that are identified in the template. In the present example, command re-generator 24 retrieves the following object values: <1>=foo; <2>=11. Command re-generator then substitutes the foregoing objects into the template to form a final command: "username foo level 11". This is the same command as previously entered in configuring the device. The final command may be provided as output to a console interface, for visual display to a user, or may be provided as output to a requesting process, for programmatic use.

2.3 Multi-Option Command Example

As a second example, assume that an administrator defines a command having the syntax of the following form, with certain command options:

username xxx level yyy group {AA or BB or CC}"

This command can be represented as:

username <object-1> level <object-2> group <object-3>

Assume that the defined conditions are:

(a) If level is less than 10, the user can choose from all groups: AA, or BB, or CC.

(b) If level is between 10 and 20, the user can choose group BB, or CC.

(c) If level is between 20 and 30, the user can choose only group CC.

Assume further that <object-1> and <object-2> are defined in the command definition file 12 in the same manner as for the preceding example given above. In this example, <object-3> can be defined in the command definition file as:

```
Option:
    If <2> LT 10;
    keyword: AA
        object <3>
NextOption:
    If <2> LT 20;
    keyword: BB
        object <3>
NextOption:
    If <2> LT 30;
    keyword: CC
        object <3>
EndOption;
```

As part of processing according to FIG. 2A, the tuple or pattern created is: /cfg/gl/username/<1>/level/<2>=<3>. Further, the following template is formed as part of FIG. 2A:

"username <1> level <2> group {{<2> LT 10, <3> AA} or
    {<2> LT 20, <3> BB} or
    {<2> LT 30, <3> CC}
}"

Assume that at run time, a user enters the command: "username foo level 11 group BB", which is received at step 210 of FIG. 2B. During the processing of step 212 to step 216 of FIG. 2B, the received command is saved into the system database 22 as: /cfg/gl/username/foo/level/11=BB.

Assume further that a user then enters the command "show username", which is received at step 310 of FIG. 3. According to FIG. 3, the request to re-generate the "username" command is processed as follows. All object values, <1>, <2> and <3>, are retrieved from the system database 22 or cache 26, and are found to have the following values: <1>=foo; <2>=11; <3>=BB. This operation is performed once, and if the retrieved object values were not already in the cache, then the retrieved object values are cached at step 316.

Re-generation continues by determining the username name by matching object <1> with "foo". The value "11" is substituted for object <2> as the level number. The re-generation process then compares the value for object <2> with 10, according to the conditions specified above, but fails. The process compares the value of object <2> with 20 and succeeds; the process then determines the group as BB from object <3>.

At this point, all logical processing for the option statement is complete, because the statement is an "or" operation, and an option "BB" is fulfilled. The processing for this statement consists of up to 3 selection operations, all sharing objects <2> and <3>. As a result, the final command provided as output at step 320 is: "username foo level 11 group BB".

If any of steps 312, 314, or 316 of FIG. 3 are unsuccessful, for example, if no object value is found in the system database 22 or cache 26 when needed, then error processing is performed. In one embodiment, in such error processing a command is not generated, and command processing terminates. Accordingly, embodiments herein provide a deterministic process that generates output only when correct data is available. Additionally, the approaches herein provide an object-oriented approach that induces command developers to use objects as the basis for designing command logistics and sequencing.

The use of an object cache 26 for local storage of object values provides significant improvements over prior approaches. Because the cache 26 is accessible locally to command re-generator 24 and is also accessible to external processes, the cache facilitates rapid interaction with re-generated command object values and relieves system database 22 of processing loads. External processes can request command values as objects without regard to the syntax of a particular command. Further, when network device 10 is arranged as a complex, multi-processor, distributed packet routing system, as in the case of the Cisco CRS Series Carrier Routing System from Cisco Systems, Inc., the use of cache 26 enables multiple instances of command re-generator 24 to rapidly obtain object values from a single local location without processing delays or latency involved in accessing the system database 22. Objects can be used locally or provided in response to calls from external processes.

Command-path patterns and templates may be stored in the cache 26. This approach facilitates re-generation of several commands that use the same pattern or template, and supports repeated re-generation of the same command. Thus, to process a subsequent request for re-generation of a command that was re-generated earlier in the same session, command re-generator 24 can retrieve the command-path pattern and template from the cache 26 rather from system database 22.

Cache 26 also supports rapid, efficient re-generation of commands that have sub-modes. To facilitate cache retrieval of object values for command sub-modes, cache entries of related object values carry links that associate the cache entries with other cache entries. The following shows an example of object-based submode command re-generation with caching. Continuing with the previous example, a command submode may be defined under the command "username xxx" as follows. In the command definition file, the submode is defined as:

keyword: username
      object <1>
    submode: "username_sub"

Under the specified submode, other commands are defined, including the original example command, as in the following example:

```
username <object-1> level <object-2> group <object-3>
username <object-1> address <object-4>
```

```
username <object-1> password <object-5>
username <object-1> id <object-6>
```

As in the previous example, assume the following commands are entered under "username foo":

```
username foo              <---- submode-command for commands 1-4
  level 11 group BB       <---- command1
  address USA             <---- command2
  password ****           <---- command3
  id 1234                 <---- command4
```

In the present approach, command re-generator 24 maintains a table to cache the submode name, along with object numbers that identify associated objects. From the stored submode-name and object-numbers, if there is a match in the subsequent commands, then the submode-command is used, and is not re-generated because it was previously generated. For example, if the command-regenerator 24 already has generated command1, then an entry in cache 26 may be:

submode-name: "username_sub"
    submode-objects: <1>
    submode-command: "username foo"

Thereafter, when command re-generator 24 needs to re-generate command2, command3 and command4, the command re-generator determines that there is a match in submode "username_sub", and as a result, the first part of command2, command3, and command4 should be "username foo". Therefore, in this case, only the second part of the command needs to be re-generated. Thus, using the approach herein, significant savings in database resources occurs if the number of objects in the submode increases, or more sub-commands are added.

2.4 Mapping Command Templates to Leaf Nodes in Database

In one approach, as part of steps 204, 206, a one-to-one mapping is created from a command template and a path to a leaf node in the system database that contains an object value for an associated command. In one embodiment, the mapping is represented in a separate data structure formed as a balanced tree that maps uniquely a path pattern, for example "/cfg/gl/username/*/level", to a leaf containing the template. The mapping tree is created at initialization time. The mapping is carried out on an as-needed basis, according to the pathname of the command tuple. Once the template is found, the actual command matching and generation process can further proceed.

As a result, given a path to the tree leaf node, command re-generator 24 can find the corresponding command template. Then, by retrieving all object values associated with the tree leaf node, command re-generator 24 can re-generate a command with the actual values previously entered for the command.

Command re-generator 24 may receive a path to a tree leaf node in two basic ways. A path may be received implicitly through a command, or from a process that calls the command re-generator 24. For example, when a user issues a "show config running" command, indicating that a user wishes to display the entire then-current configuration, or when the command re-generator 24 is called to show an entire configuration, the command re-generator traverses the entire tree of system database 22, finds all nodes that have values, and generates the corresponding commands based on the pathnames. Alternatively, a path to a tree leaf node may be received when a user wants to query only part of the configuration or a subset of the configuration. For example, a user issues the command "show config username". In this case, because "username" is a keyword that defines the necessary tuple pathname in the system database 22, the pathname is implicitly given by the command itself. The command re-generator 24 then retrieves the subtree /cfg/gl/username/ and generates all the user-names in the system.

Using this approach, unlike past approaches, a single command definition supports both parsing and command re-generation. A command template and a path in a system database that holds configuration information are associated and are provided to the command re-generator together automatically. A command template and its associated path are stored in a balanced tree of a database as tree nodes, facilitating rapid search and look-up using tree search techniques. Further, if a new command template and its path cannot be added into the database tree because the command path conflict with the existing paths in the tree, then a new tree is created, and the new command template and its path are added to the new tree.

In this approach, if a command and its configuration hierarchy path are defined, then a command can be re-generated from actual configuration state data, based on values of the database tree leaf nodes, automatically by a generic command re-generator 24. No special code is needed to generate a command from its configuration state represented in the system database. In addition, the command re-generator cannot produce an incorrect command, because the command template already maps to its configuration hierarchy path. Further, given one or more configuration database sub-trees, a group of commands may be generated by iterating through all leaf nodes in the sub-trees.

3.0 Implementation Mechanisms

Hardware Overview

Figure 4:
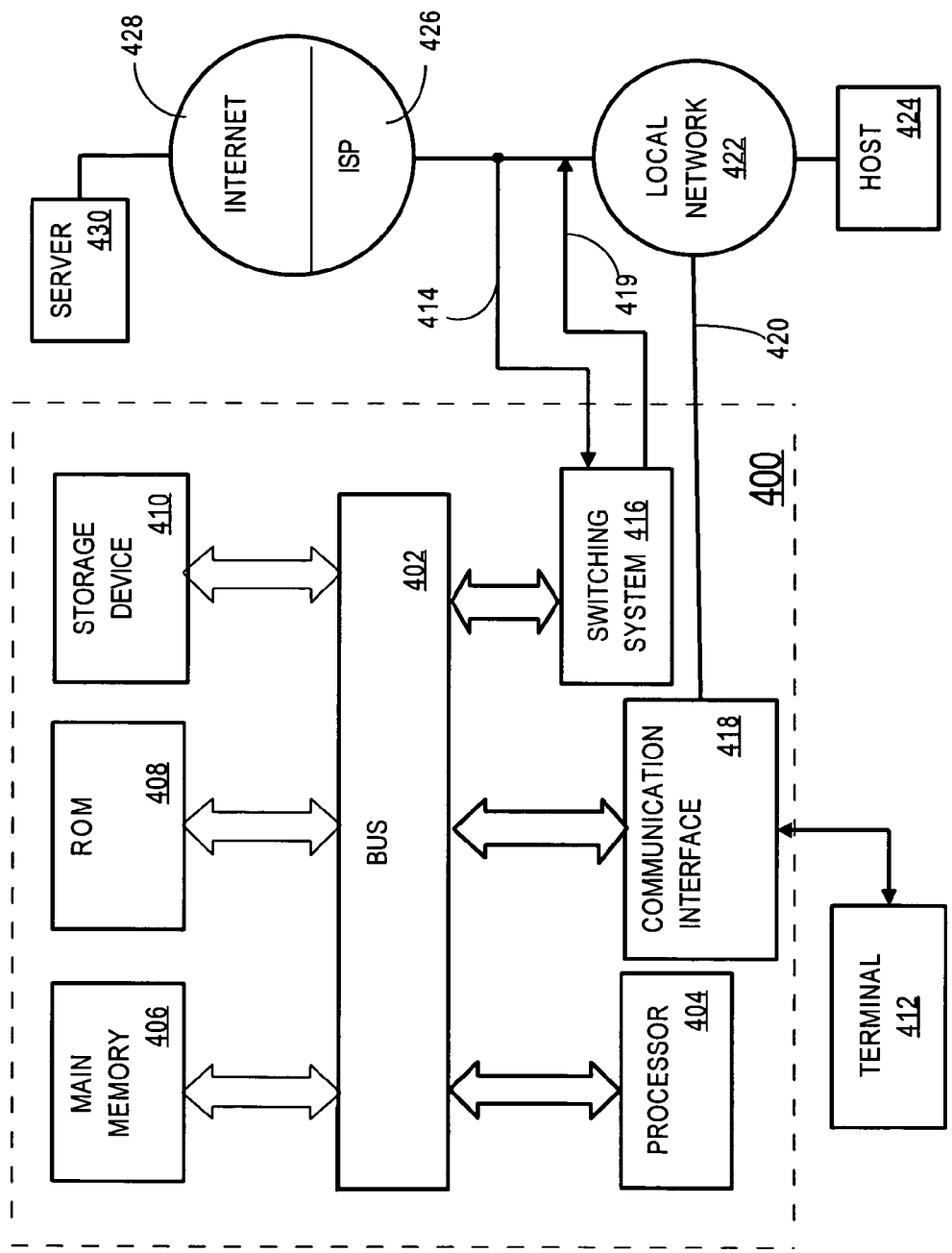
FIG. 4 is a block diagram of a computer system upon which an implementation may be used.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for re-generating configuration commands of a network device using an object-based approach. According to one embodiment of the invention, re-generating configuration commands of a network device using an object-based approach is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for re-generating configuration commands of a network device using an object-based approach as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of re-generating configuration commands of a network device using an object-based approach, comprising the computer-implemented steps of:
    creating and storing one or more command-path patterns and one or more command templates representing one or more configuration commands for a network device, wherein one or more of the one or more configuration commands define one or more parameters;
    receiving a particular configuration command and one or more particular parameters;
    wherein each particular parameter of the one or more particular parameters is associated with a particular value;
    creating one or more objects respectively representing the one or more particular parameters based on parsing the particular configuration command;
    wherein a particular object of the one or more objects contains a value associated with a particular parameter of the one or more particular parameters;
    receiving a request to re-generate the particular configuration command;
    in response to receiving the request to re-generate the particular configuration command:
        retrieving a template and a pattern associated with the particular configuration command;
        based on the pattern, retrieving all objects containing values for all the one or more particular parameters; and
        creating a re-generated configuration command by substituting the values of the retrieved objects into the template;
        wherein the re-generated configuration command comprises the text of the particular configuration command;
    wherein the method is performed by one or more network devices.

2. A method as recited in claim 1, further comprising providing the re-generated configuration command as output in response to a "show" command.

3. A method as recited in claim 1, further comprising providing the re-generated configuration command as output to a requesting process.

4. A method as recited in claim 1, wherein retrieving all objects further comprises storing the one or more objects in a cache in main memory.

5. A method as recited in claim 1, further comprising the steps of:
    retrieving all objects containing values for all parameters of all the received configuration commands; and
    storing all the objects in a cache in main memory.

6. A method, comprising the computer-implemented steps of:
    receiving a request to re-generate a configuration command previously issued to a network device, wherein the configuration command has one or more parameters;
    wherein each parameter of the one or more parameters is associated with a particular value:
    in response to receiving the request to re-generate the configuration command:
        retrieving a template and a pattern associated with the configuration command, wherein the template represents a syntax for the configuration command, wherein the pattern represents a storage location for the configuration command;
        based on the pattern, retrieving, from an object database, objects containing values for all the one or more parameters from the storage location specified by the pattern; and
        wherein a particular object of the one or more objects contains a value associated with a particular parameter of the one or more parameters;
        creating a re-generated configuration command by substituting the values of the retrieved objects into the template;

wherein the re-generated configuration command comprises the text of the configuration command;
wherein the method is performed by one or more network devices.

7. A method as recited in claim 6, further comprising:
receiving a command definition file that defines the syntax of the configuration command;
compiling the command definition file to result in creating and storing one or more command-path patterns and command templates corresponding to the configuration command.

8. A method as recited in claim 6, further comprising:
receiving a particular configuration command;
creating one or more objects in the object database for one or more argument values of the particular configuration command;
storing the created objects in the object database based on the template.

9. A method as recited in claim 6, further comprising providing the re-generated configuration command as output in response to a "show" command.

10. A method as recited in claim 6, further comprising providing the re-generated configuration command as output to a requesting process.

11. A method as recited in claim 6, wherein retrieving the objects further comprises creating the objects in a cache in main memory.

12. A method as recited in claim 6, further comprising the steps of:
retrieving second objects containing values for all parameters of one or more commands; and
storing the second objects in a cache in main memory.

13. A computer-readable volatile or non-volatile storage medium storing one or more sequences of instructions, which instructions, when executed by one or more processors, cause the one or more processors to carry out the steps of:
receiving a request to re-generate a configuration command previously issued to a network device, wherein the configuration command has one or more parameters;
wherein each parameter of the one or more parameters is associated with a particular value:
in response to receiving the request to re-generate the configuration command:
retrieving a template and a pattern associated with the configuration command, wherein the template represents a syntax for the configuration command, wherein the pattern represents a storage location for the configuration command;
based on the pattern, retrieving, from an object database, objects containing values for all the one or more parameters from the storage location specified by the pattern; and
wherein a particular object of the one or more objects contains a value associated with a particular parameter of the one or more parameters;
creating a re-generated configuration command by substituting the values of the retrieved objects into the template;
wherein the re-generated configuration command comprises the text of the configuration command.

14. A computer-readable medium as recited in claim 13, further comprising instructions which, when executed by the one or more processors, cause the one or more processors to carry out:
receiving a command definition file that defines the syntax of the configuration command;
compiling the command definition file to result in creating and storing one or more command-path patterns and command templates corresponding to the configuration command.

15. An apparatus, comprising:
means for receiving a request to re-generate a configuration command previously issued to a network device, wherein the configuration command has one or more parameters;
wherein each parameter of the one or more parameters is associated with a particular value;
means for retrieving a template and a pattern associated with the configuration command, wherein the template represents a syntax for the configuration command, wherein the pattern represents a storage location for the configuration command;
means for retrieving from an object database, based on the pattern, objects containing values for all the one or more parameters from the storage location specified by the pattern; and
wherein a particular object of the one or more objects contains a value associated with a particular parameter of the one or more parameters;
means for creating a re-generated configuration command by substituting the values of the retrieved objects into the template;
wherein the re-generated configuration command comprises the text of the configuration command;
wherein each of the retrieving means and the creating means are responsive to receiving the request to re-generate the configuration command.

16. An apparatus as recited in claim 15, further comprising means for
receiving a command definition file that defines the syntax of the configuration command; means for compiling the command definition file to result in creating and storing one or more command-path patterns and command templates corresponding to the configuration command.

17. An apparatus, comprising:
a network interface that is coupled to the data network for receiving one or more packet flows therefrom;
a processor;
a computer-readable volatile or non-volatile storage medium storing one or more stored sequences of instructions which, when executed by the processor, cause the processor to carry out the steps of:
receiving a request to re-generate a configuration command previously issued to a network device, wherein the configuration command has one or more parameters;
wherein each parameter of the one or more parameters is associated with a particular value;
in response to receiving the request to re-generate the configuration command:
retrieving a template and a pattern associated with the configuration command, wherein the template represents a syntax for the configuration command, wherein the pattern represents a storage location for the configuration command;
based on the pattern, retrieving, from an object database, objects containing values for all the one or more parameters from the storage location specified by the pattern; and
wherein a particular object of the one or more objects contains a value associated with a particular parameter of the one or more parameters;

creating a re-generated configuration command by substituting the values of the retrieved objects into the template;

wherein the re-generated configuration command comprises the text of the configuration command.

18. An apparatus as recited in claim 17, further comprising instructions which, when executed by the one or more processors, cause the one or more processors to carry out:

receiving a command definition file that defines the syntax of the configuration command;

compiling the command definition file to result in creating and storing one or more command-path patterns and command templates corresponding to the configuration command.

19. A computer-readable medium as recited in claim 13, further comprising instructions which, when executed by the one or more processors, cause the one or more processors to carry out:

receiving a particular configuration command;

creating one or more objects in the object database for one or more argument values of the particular configuration command;

storing the created objects in the object database based on the template.

20. A computer-readable medium as recited in claim 13, further comprising instructions which when executed cause providing the re-generated configuration command as output in response to a "show" command.

21. A computer-readable medium as recited in claim 13, further comprising instructions which when executed cause providing the re-generated configuration command as output to a requesting process.

22. A computer-readable medium as recited in claim 13, further comprising instructions which when executed cause retrieving the objects by creating the objects in a cache in main memory.

23. A computer-readable medium as recited in claim 13, further comprising instructions which when executed cause:

retrieving second objects containing values for all parameters of one or more commands; and storing the second objects in a cache in main memory.

24. An apparatus as recited in claim 17, further comprising instructions which when executed cause:

receiving a particular configuration command;

creating one or more objects in the object database for one or more argument values of the particular configuration command;

storing the created objects in the object database based on the template.

25. An apparatus as recited in claim 17, further comprising instructions which when executed cause providing the re-generated configuration command as output in response to a "show" command.

26. An apparatus as recited in claim 17, further comprising instructions which when executed cause providing the re-generated configuration command as output to a requesting process.

27. An apparatus as recited in claim 17, further comprising instructions which when executed cause retrieving the objects by creating the objects in a cache in main memory.

28. An apparatus as recited in claim 17, further comprising instructions which when executed cause:

retrieving second objects containing values for all parameters of one or more commands; and storing the second objects in a cache in main memory.

29. An apparatus as recited in claim 15, further comprising:

means for receiving a particular configuration command;

means for creating one or more objects in the object database for one or more argument values of the particular configuration command;

means for storing the created objects in the object database based on the template.

30. An apparatus as recited in claim 15, further comprising means for providing the re-generated configuration command as output in response to a "show" command.

31. An apparatus as recited in claim 15, further comprising means for providing the re-generated configuration command as output to a requesting process.

32. An apparatus as recited in claim 15, wherein the means for retrieving the objects further comprises means for creating the objects in a cache in main memory.

33. An apparatus as recited in claim 15, further comprising:

means for retrieving second objects containing values for all parameters of one or more commands; and means for storing the second objects in a cache in main memory.

* * * * *